United States Patent [19]

Plumer et al.

[11] Patent Number: 5,498,946
[45] Date of Patent: Mar. 12, 1996

[54] DEVICE FOR CONTROLLING THE VARIATION OF THE POWER AND/OR THE SPEED OF A LOAD

[75] Inventors: Louis Plumer, Belfort; Michel Abignoli, Villers-les-Nancy; Abdelkader Mansouri, Vandoeuvre; Michel Jacob, Hennebont, all of France

[73] Assignee: Plumer (Societe Anonyme), Saint Louis, France

[21] Appl. No.: 237,172

[22] Filed: May 3, 1994

[30] Foreign Application Priority Data

May 5, 1993 [FR] France ................... 93 05548

[51] Int. Cl.⁶ ........................ H02P 7/42; H02M 5/02
[52] U.S. Cl. ............... 318/809; 318/812; 323/320; 363/148
[58] Field of Search ........................ 318/244, 245, 318/254, 732, 810, 811, 809, 812; 323/208, 209, 212, 213, 237, 265, 299, 300, 304, 311, 320; 363/34, 37, 41, 148

[56] References Cited

U.S. PATENT DOCUMENTS

| | | |
|---|---|---|
| 3,906,337 | 9/1975 | Depenbrock . |
| 4,431,958 | 2/1984 | Schutten et al. . |
| 4,433,369 | 2/1984 | Noro . |
| 4,581,696 | 4/1986 | Gyugyi et al. . |
| 4,633,161 | 12/1986 | Callahan et al. . |
| 4,780,652 | 10/1988 | Rilly . |

*Primary Examiner*—Bentsu Ro
*Attorney, Agent, or Firm*—Sandler, Greenblum & Bernstein

[57] ABSTRACT

The invention relates to a device for controlling the variation of the power and/or the speed of a load (2), such as an asynchronous, synchronous, universal motor, a transformer, an inductance, a condenser or a resistor, comprising a switch (5) placed on a phase (4) of a single-phase or multiphase alternating-current supply-circuit (3), this switch (5) being associated with means (6) for controlling the cyclic ratio $\alpha/T$ in which $\alpha$ corresponds to the time of opening and closing of the circuit (3) by the switch (5) and T to the period of the phase (4) on which this latter is placed. In fact, the switch (5) is of the bidirectional MOS, IGBT or bipolar transistor switch type, this switch (5) being associated with means (9) for controlling the switching time, of the DRIVER type, capable of extending the switching time at closing so that it be within a range from 10 microseconds to 1 millisecond.

20 Claims, 2 Drawing Sheets

DEVICE FOR CONTROLLING THE VARIATION OF THE POWER AND/OR THE SPEED OF A LOAD

BACKGROUND OF THE INVENTION (1) Field of the Invention

The invention relates to a device for controlling the variation of the power and/or the speed of a load, for example, such as an asynchronous, a synchronous, or a universal motor, a transformer, an inductor, a condenser, or a resistor, comprising a switch connected to a phase of a single-phase or multiphase alternating-current supply-circuit, this switch being associated with means for controlling the cyclic ratio α/T, in which α corresponds to the time of opening or closing of the circuit by the switch, and T is the period of the phase on which this latter is placed.

(2) Description of the Prior Art

As a device for controlling the variation of the power and/or the speed of a load, such as, for example, an asynchronous, a synchronous, or a universal motor, a transformer, an inductance, a condenser or a resistor, for the time being there is more particularly known the triac regulator and the high-frequency chopper grouping, as described above, a switch placed on the alternating-current supply-circuit as well as means for controlling the time of opening and/or closing of this circuit by the switch during an alternation or period of the supply circuit. These control means thus modulate the speed and/or the power of the load.

However, these known control devices have a number of drawbacks.

For example, the triac regulator has an unflexible operation and, when switching, generates very high current-peaks in the supply network which it is connected to. This results in the generation of noises in the magnetic circuits and in the supply of harmonic currents to the load, generating high counter electromotive forces and a very low torque at low speed. Such a device creates radio- and television interferences and harmonics which contaminate the supply network.

The control device of the high-frequency chopper type copes with the drawback of the magnetic noise generated by the triac regulator by transferring this noise to frequencies that are inaudible to the human ear. However, such a control device causes the transistors it is comprised of, as well as the load, to overheat. This overheating of the transistors results from the numerous switchings generated by this chopper, while the overheating of the load is due to losses from Foucault (eddy) currents in the magnetic circuits. In addition, with such a high-frequency chopper, the same drawbacks as those already mentioned with respect to the triac regulator, such as generation of counter electromotive forces by the load, radio- and television interferences and harmonics contaminating the network, are experienced.

SUMMARY OF THE INVENTION

This invention is particularly aimed at coping with all these drawbacks experienced with the known control devices, e.g., by ensuring the suppression of the magnetic noises and by considerably reducing the counter electromotive force generated by the load, which leads to a far higher efficiency. This invention furthermore proposes to cope with the problem of the contaminating harmonics by allowing to suppress or reduce viz. those which are of a higher amplitude than the standards often laid on by the electric-current producers or distributors.

The invention as characterized in the claims solves the problem and consists in a device for controlling the variation of the power and/or the speed of a load, such as an asynchronous, synchronous, universal motor, a transformer, an inductance, a condenser or a resistor, comprising a switch placed on a phase of a single-phase or multiphase alternating-current supply-circuit, this switch being associated with means for controlling the cyclic ratio α/T in which α corresponds to the time of opening or closing of the circuit by the switch and T to the period of the phase on which this latter is placed, the switch being of the bidirectional MOS or IGBT or bipolar transistor switch type, this switch being associated with means for controlling the switching time, of the DRIVER type, capable of extending the switching time at closing so that it be within a range from 10 microseconds to 1 millisecond.

According to another feature of the invention, the means for controlling the cyclic ratio α/T are furthermore means capable of controlling the opening of the supply circuit through the switch when being around the coercitive field of the magnetic circuit of the load, i.e. within a maximum period after reversal of the current direction corresponding to one fourth of a half-period and as long as being below a nominal-current triggering threshold corresponding to one third of the value of the maximum nominal current.

The invention also relates to a device for controlling the variation of the power and/or the speed of a load, such as an asynchronous, synchronous, universal motor, a transformer, an inductance, a condenser or a resistor, comprising a switch placed on a phase of a single-phase or multiphase alternating-current supply-circuit, this switch being associated with means for controlling the cyclic ratio α/T in which α corresponds to the time of opening or closing of the circuit by the switch and T to the period of the phase on which this latter is placed, the switch being of the bidirectional MOS or IGBT or bipolar transistor switch type, while the control means are determined so as to be capable of controlling several circuit opening and closing cycles during a half-period, the moments of triggering of the cycle or cycles being preset or determined by an appropriate detection circuit, in order to suppress or reduce one or several harmonics generated by a first opening and closing cycle.

The advantages achieved thanks to this invention mainly reside in that the control device into which it results, while making use of economical electronic components to achieve an inexpensive cost price, enables to achieve results so far unequalled by the known devices. Thus, through a perfect control of the switching time of the switch, it is possible to cause the speed and/or the power of a load to vary without there therefore resulting a magnetic noise or even the generation of harmonics contaminating the supply network.

Other scopes and advantages of this invention will appear during the description which follows backed up by the attached drawings relating to one embodiment given by way of an example.

DESCRIPTION OF THE PREFERRED EMBODIMENT

Figure 5:
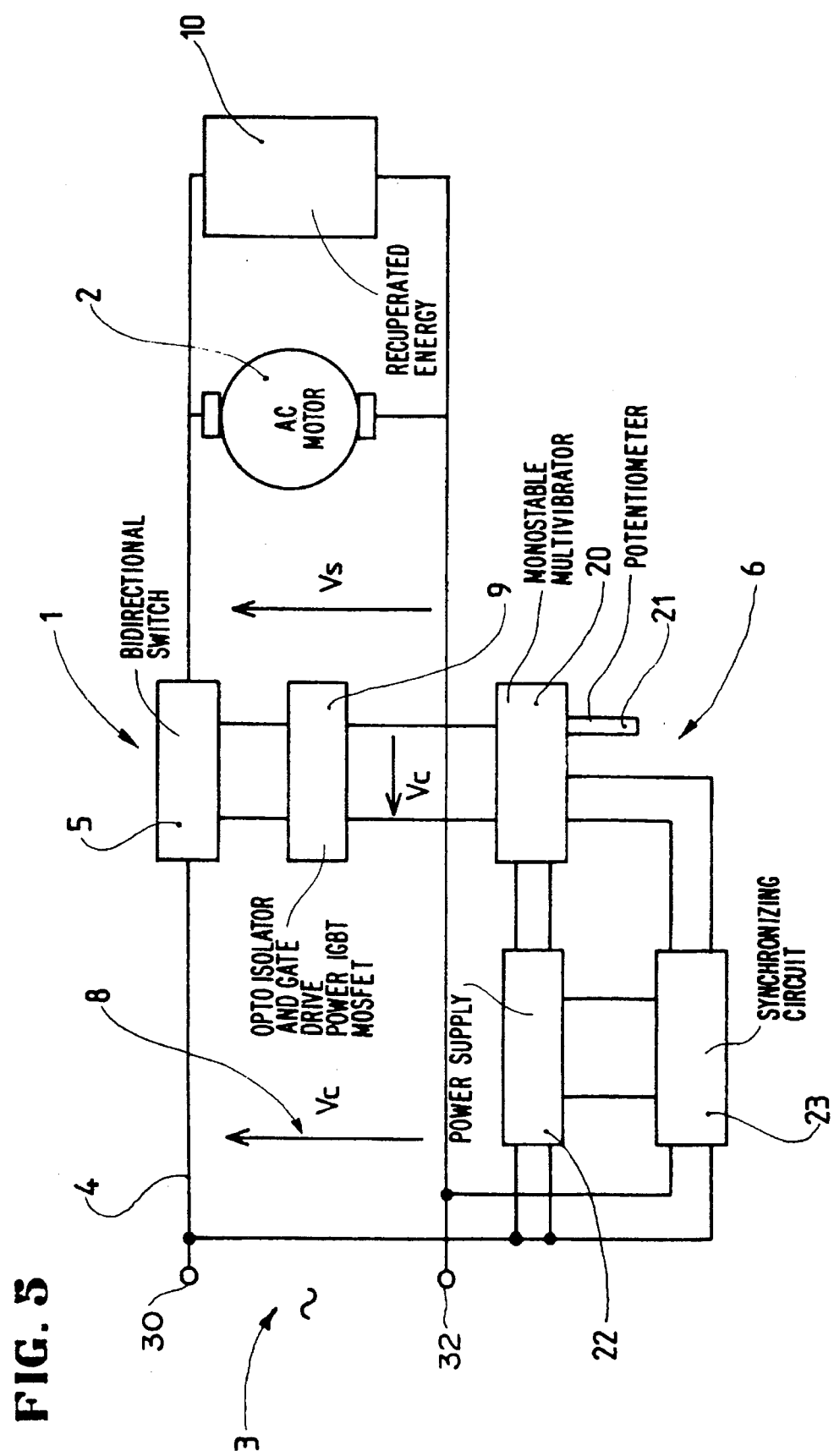

As shown in FIG. 5, device 1 controls the variation of the power and/or the speed of a load 2 which, within the framework of the drawings and the description which follows, more particularly comprises in an asynchronous motor. It is however obvious that this invention, and thus the control device 1, is also applicable to other kinds of loads, such as a synchronous motor, a universal motor, a transformer, an inductance, a condenser or even a resistor.

Figure 1:
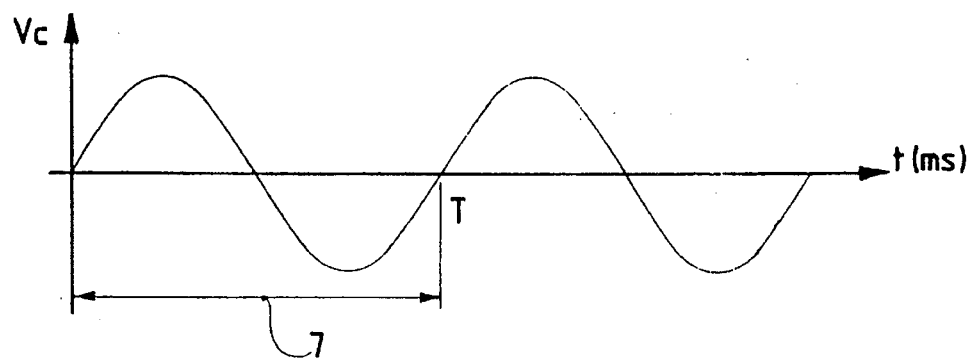
FIG. 1 shows the chronogram of the voltage Vc of the alternating-current supply-network.

Load is connected to terminals of a single-phase or alternating-current supply-circuit 3 with voltage $V_c$, the wave form of which is shown in the timing diagram of FIG. 1. However, it is understood that the load 2 can be connected to a multiphase alternating-current electrical supply.

Figure 2:
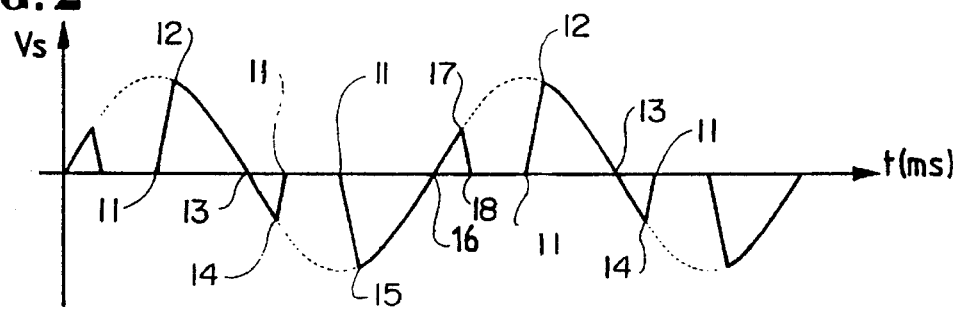
FIG. 2 shows the chronogram of the voltage Vc at the terminals of the load, FIG. 3 schematically shows the hysteresis cycle of the magnetization of the magnetic circuit of the load pursuant to the chopping of an alternation by means of the switch, this as shown by the chronogram of FIG. 2.
Figure 4:
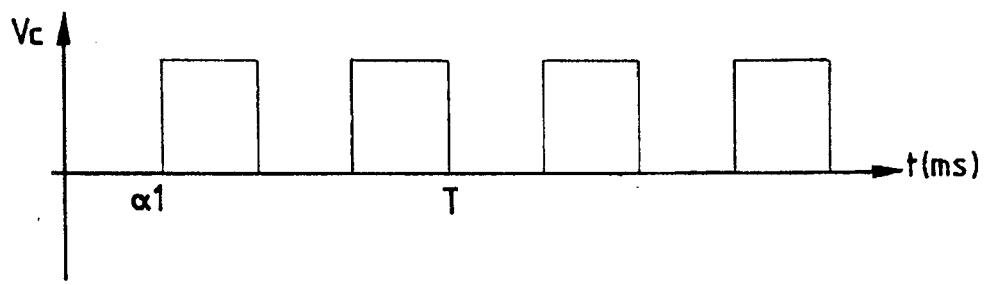
FIG. 4 is an illustration of the chronogram of the control voltage Vc at the terminals of the DRIVER proceeding from the means for controlling the cyclic ration α/T, FIG. 5 corresponds to the functional diagram of the control device connected to a load, such as an asynchronous motor.

Control device 1 includes a switch 5 placed on this phase 4 and associated with means 6 for controlling the cyclic ration α/T, in which α corresponds to the time of opening or closing of the circuit 3 through the switch 5, and T is an alternation or period of the phase 4 as shown from the timing diagrams of FIGS. 1, 2 and 4. It should be noted that these chronograms show the case in which the control means 6 control a single opening and closing of the circuit 3 per half alternation (period T) through the switch 5. According to the invention, it is foreseen that these control means 6 are capable of opening and closing the circuit several times during a half-period in order to further reduce the harmonics contaminating the network. In fact, the triggering of this cycle or cycles following the initial one are controlled at moments preset to experimental measurements or measurements detected by an appropriate detection circuit, to suppress generated harmonics.

According to the invention, switch 5 comprises a bidirectional MOS, an IGBT or a bipolar transistor, associated with current-rectifying means of a diode-bridge or MOS transistor type.

In addition, the bidirectional transistor switch 5 is associated with DRIVER-type control means 9 capable of controlling the switching (closing) time, of switch 5 with a view towards extending this switching time to a range of from 10 microseconds to 1 millisecond. It should be noted that the maximum switching time is limited by the thermal capacity and cooling down of the switch 5, as well as by the switched current.

The normal switching time of a MOS transistor ranges from 65 nanoseconds to 160 nanoseconds, resulting in straight fronts at the level of the curve described by the supply voltage at the terminals of the load 2. This produces high current peaks in the network which, as already stated, cause characteristic magnetic noises and interference.

By suppressing especially at the closing of switch 5, these straights fronts by means of gradual slopes as shown in the chronogram of FIG. 2 by increasing the switching time, one copes with the above-mentioned drawbacks, high current peaks are suppressed.

Control means a comprises a photocoupler (optoisolator) which provides electrical isolation between the power circuit and the control circuit and a divider circuit that controls the switching operation of the switch 5. It also slowly closes the power switch by gradually loading the input capacity of the transistor.

According to a feature of the invention, connected in parallel with the load 2 are means 10 for recovering the energy stored by this latter, viz. when a motor is concerned, during the opening of the bidirectional transistor switch 5. Such means 10 comprises a second bidirectional transistor switch analogous to switch 5, but opposedly controlled or even controlled by a capacitor. It is indeed important for this energy to be recovered, otherwise a counter electromotive force is produced and feedback power is consumed.

According to a feature of invention, connected in parallel with the load 2 are means 10 for recovering the energy stored by this latter, viz. when a motor is concerned, during the opening of the bidirectional transistor switch 5. Such means 10 comprises a second bidirectional transistor switch analogous to switch 5, but opposedly controlled or even controlled by a capacitor. It is indeed important for this energy to be recovered, otherwise a counter electromotive force is produced and feedback power is consumed.

Figure 3:
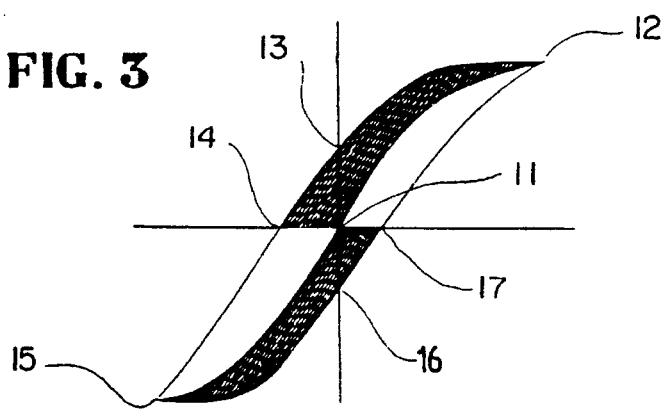

According to another feature of the invention, the means 6 for controlling the cyclic ratio α/T includes means for controlling the opening of the supply circuit 3, through the switch 5, when approaching the coercive force of the magnetic circuit of the load 2. Thus, according to the invention, it is recommended that circuit opens within a maximum period, upon reversal of the current direction, corresponding to one fourth of a half-period ½ so long as the current is below a nominal-current triggering threshold corresponding to one third of the value of the maximum nominal current. FIG. 3 shows the hysteresis cycle of the magnetic circuit, after chopping of the supply circuit through switch 5 and, accordingly, during a voltage Vs at the terminals of the load 2 corresponding to the chronogram of FIG. 2. Thus, one observes that the opening of the circuit is controlled through control means 6 when the voltage Vs is located at position 11 of this chronogram. In these circumstances, one is on the hysteresis cycle shown in FIG. 3, corresponding to the coercive force of the magnetic circuit of the load 2. Thus, at the time of closing of the supply circuit 3 (position 11 in FIG. 2), the cycle describes the first magnetization curve 11, 15, 16, 17, 11. When this opening, followed by the closing, is controlled whilst the voltage Vs is above the abscissa, the hysteresis cycle describes the magnetization curve 11, 12, 13, 14, 11.

By way of comparison, it should be noticed that prior art control devices open the circuit, not at the zero-point of the hysteresis cycle, but when its remanent field is equal to zero. This results into contributing, at least partly, to generating characteristic magnetic noise.

The specific means for opening the circuit around the coercive force of the magnetic circuit of the load are carried out, in an open-loop configuration, by a preliminary setting ,which integrates all the parameters of the magnetic circuit and its load. In a closed-circuit configuration, use is made of a detection circuit applied, e.g. in the case of a motor, to a winding, whether insulated or not, of the main coil of the magnetic circuit. The electromotive force at the terminals of this winding corresponds to the image of the magnetic field of the circuit and indicates, with a relative precision, the magnetic zero-point. Thus, the detection circuit intervenes, in closed loop, onto the control circuit in order to obtain, at the desired moment, to open the circuit by means of the transistor.

Means 6 for controlling the cyclic ration α/T, preferably consist of a monostabler multivibrator 20 provided with external control means 21 of the potentiometer, commutating switch type or the like onto which the user can act to modulate this cyclic ratio α/T and, accordingly, the speed and/or the power of the load 2. Monostable multivibrator 20 is supplied with a low-voltage current, e.g. 12 volts, through a power supply 22 which is connected to the terminals 30 and 32 of the alternating-current supply-circuit 3.

One should also notice the presence of a synchronizing circuit 23 connected to the alternating-current supply-circuit 3, the function of which is to deliver to the monostable multivibrator 20 a square signal of wave having a period T, synchronized with the supply voltage Vc. This synchronized signal is of the low-voltage type, the synchronizing circuit 23 being connected for this purpose to the power supply 22 which ensures its current supply.

Finally, based on this signal delivered by the synchronizing circuit 23, the monostable multivibrator 20 delivers, in turn, a square wave signal having a cyclic-ratio α/T for controlling the opening and closing of the switch 5, the switchings being controlled by control means 9 interposed between switch 5 and the monostable vibrator 20.

As a result, the control device 1 according to the invention provides a solution for all the drawbacks of the hitherto known control devices, i.e. suppression of the magnetic noise and the radio, television interferences or even of the harmonics contaminating the network, and this with a higher efficiency and a similar cost price. As a result, this control device according to the invention should be considered as a clear progress in the technical field considered.

I claim:

1. A device for controlling at least one of a power variation and a speed variation of a load connected to an alternating-current supply, comprising:

means for switching a phase of said alternating-current supply;

first means for controlling a cyclic ratio α/T of said phase of said alternating-current supply, wherein α is equal to one of a time of opening or a time of closing of said alternating-current supply by said switching means, and T is equal to a period of said phase; and second means for controlling an extending of the switching time at said closing of said alternating-current supply to be within a range of approximately 10 microseconds to 1 millisecond, wherein said first controlling means further controls an opening of said alternating-current supply when approaching a coercive force of a magnetic circuit of said load upon reversal of a current direction, corresponding to approximately one fourth of a half-period as long as said magnetic circuit is below a nominal-current triggering threshold corresponding to one-third of a value of a maximum nominal current.

2. The device of claim 1, wherein said switching means comprises a bidirectional switch.

3. The device of claim 2, wherein said bidirectional switch comprises one of a bidirectional MOS transistor, an IGBT transistor or a bipolar transistor.

4. The device of claim 1, further comprising means for recovering electrical energy from said load.

5. The device of claim 4, wherein said recovering means is connected in parallel with said load.

6. The device of claim 4, wherein said recovering means recovers electrical energy from said load during an opening of said switching means.

7. The device of claim 4, wherein said recovering means comprises one of a bidirectional MOS transistor type switch, an IGBT transistor type switch, a bipolar transistor type switch or a capacitor.

8. The device of claim 1, wherein said first controlling means comprises a monostable multivibrator.

9. The device of claim 8, wherein said monostable multivibrator further comprises means for adjusting said cyclic ratio α/T.

10. The device of claim 9, wherein said adjusting means comprises an external potentiometer.

11. The device of claim 9, wherein said adjusting means comprises a commutating switch.

12. The device of claim 8, further comprising a low-voltage power supply that supplies electrical power to said monostable multivibrator.

13. The device of claim 8, further comprising a synchronizing circuit connected to said alternating-current supply to deliver a signal of a predetermined shape and predetermined period to said monostable multivibrator that is synchronized with a supply voltage from said alternating-current supply.

14. The device of claim 13, wherein said predetermined shape of said signal comprises a square wave.

15. The device of claim 1, wherein said first controlling means controls a plurality of opening and closing cycles of said alternating-current supply during said half-period, triggering moments of said first controlling means being selected to reduce at least one harmonic generated by a first opening and closing cycle.

16. A device for controlling at least one of a power variation and a speed variation of a load connected to an alternating-current supply, comprising:

a switching unit that switches a phase of said alternating-current supply;

a multivibrator unit that controls a cyclic ratio α/T of said phase of said alternating-current supply, wherein α is equal to one of a time of opening or a time of closing of said alternating-current supply by said switching unit, and T is equal to a period of said phase;

an extending unit that controls an extending of said switching time at said closing of said alternating-current supply to be within a range of approximately 10 microseconds to 1 millisecond, wherein said multivibrator unit further controls an opening of said alternating-current supply when approaching a coercive force of a magnetic circuit of said load upon reversal of a current direction, corresponding to approximately one fourth of a half-period as long as said magnetic circuit is below a nominal-current triggering threshold corresponding to one-third of a value of a maximum nominal current.

17. The device of claim 16, further comprising a synchronizing unit connected to said alternating-current supply to deliver a signal of a predetermined shape and predetermined period to said multivibrator unit that is synchronized with a supply voltage from said alternating-current supply.

18. The device of claim 16, wherein said extending unit comprises:

an isolating unit that electrically isolates said extending unit from said alternating-current supply; and a driver circuit that controls a switching operation of said switching unit.

19. The device of claim 16, wherein said switching unit comprises one of a bidirectional MOS transistor, an IGBT transistor or a bipolar transistor.

20. A device for controlling at least one of a power variation and a speed variation of a load connected to an alternating-current supply, comprising:

a switching unit that switches at least one phase of said alternating-current supply;

first means for controlling a cyclic ratio $\alpha/T$ of said phase of said alternating-current supply, wherein $\alpha$ is equal to one of a time of opening or a time of closing of said alternating-current supply by said switching means, and T is equal to a period of said phase;

means for adjusting said cyclic ratio $\alpha/T$;

second means for controlling an extending of the switching time at said closing of said alternating-current-supply to be within a range of approximately 10 microseconds to 1 millisecond, wherein said first controlling means further controls an opening of said alternating-current supply when approaching a coercive force of a magnetic circuit of said load upon reversal of a current direction, corresponding to approximately one fourth of a half-period T as long as said magnetic circuit is below a nominal-current triggering threshold corresponding to one-third of a value of a maximum nominal current;

means for recovering electrical energy stored by said load connected in parallel with said load;

a synchronizing unit connected to said alternating-current supply to deliver a square wave signal having said period T to said first controlling means, said square wave signal being synchronized with a supply voltage from said alternating-current supply; and a low voltage power supply that supplies electrical power to said first controlling means and said synchronizing unit.

\* \* \* \* \*

UNITED STATES PATENT AND TRADEMARK OFFICE
CERTIFICATE OF CORRECTION

PATENT NO. : 5,498,946
DATED : March 12, 1996
INVENTOR(S) : L. PLUMER et al.

It is certified that error appears in the above-indentified patent and that said Letters Patent is hereby corrected as shown below:

At column 1, line 9, before "for" insert ---such as,---.

At column 1, line 10, delete "such as".

At column 3, line 10, insert ---Fig. 5 illustrates an embodiment of the present invention that is applied to a single phase alternating-current electrical supply, in which the phase signal, denoted by element 4, is provided at terminal 30 of control device 1, while a neutral sign is provided at terminal 32 of the control device 1.---.

At column 3, line 19, delete "or".

At column 3, line 63, before "high" insert ---i.e.,---.

At column 3, line 65, change "a" (first occurrence) to ---9---.

At column 4, lines 13 through 21 should be deleted in their entirety.

At column 4, line 29, before "so" insert ---T---.
At column 5, line 11, delete "signal of".

UNITED STATES PATENT AND TRADEMARK OFFICE
CERTIFICATE OF CORRECTION

PATENT NO. : 5,498,946
DATED : March 12, 1996
INVENTOR(S) : L. Plumer, et al.

It is certified that error appears in the above-indentified patent and that said Letters Patent is hereby corrected as shown below:

At column 6, line 38 (claim 16, line 11), change "said" to ---the---.

Signed and Sealed this

Thirteenth Day of August, 1996

Attest:

BRUCE LEHMAN

Attesting Officer    Commissioner of Patents and Trademarks